United States Patent [19]

Bailey

[11] Patent Number: 4,708,170

[45] Date of Patent: Nov. 24, 1987

[54] MOTOR VEHICLE FUEL TANK WITH UNITARY FUEL RESERVOIR

[75] Inventor: Wallace O. Bailey, Northville, Mich.

[73] Assignee: Ford Motor Company, Dearborn, Mich.

[21] Appl. No.: 917,874

[22] Filed: Oct. 10, 1986

Related U.S. Application Data

[62] Division of Ser. No. 727,700, Apr. 26, 1985, Pat. No. 4,638,836.

[51] Int. Cl.$^4$ .......................... B65D 1/24; B29C 49/00
[52] U.S. Cl. .................................... 137/574; 137/576; 220/22; 264/523
[58] Field of Search ...................... 137/574, 576, 264; 220/22; 264/553, 523, 537, 540

[56] References Cited

U.S. PATENT DOCUMENTS

| | | | |
|---|---|---|---|
| 3,020,950 | 2/1962 | Schraivogel | 137/574 |
| 3,881,457 | 5/1975 | Benner et al. | 137/574 |
| 4,096,223 | 6/1978 | Krall | 264/537 |
| 4,178,955 | 12/1979 | Dau | 137/264 |
| 4,179,036 | 12/1979 | Pasini | 220/22 |
| 4,256,690 | 3/1981 | Sabba | 264/553 X |
| 4,305,416 | 12/1981 | Henning et al. | 137/576 |
| 4,416,303 | 11/1983 | Scheurenbrand | 137/576 |
| 4,453,564 | 6/1984 | Bergesio | 137/574 |

Primary Examiner—Alan Cohan
Assistant Examiner—John Rivell
Attorney, Agent, or Firm—Peter D. McDermott; Roger L. May

[57] ABSTRACT

A motor vehicle fuel tank is disclosed, having a fluid pressure thermoformed tank wall comprising a bottom wall and opposed side walls unitary with and extending upwardly from the bottom wall. The fuel tank is characterized in that it has a fuel reservoir unitary with the tank wall and, specifically, formed by convolutions in the bottom wall of the tank. The fuel reservoir comprises two opposed substantially C-shaped ridges extending upwardly into the tank from the plane of the bottom wall, each such ridge extending from a corresponding one of the side walls toward the opposed side wall to a second end, diminishing in height to approximately the plane of the bottom wall at such second end. The two C-shaped ridges cooperate to partially surround a portion of the surface area of the bottom wall of the fuel tank. A channel between each ridge and the end of the other ridge permits fuel to flow into the fuel reservoir even during low fuel conditions.

2 Claims, 5 Drawing Figures

MOTOR VEHICLE FUEL TANK WITH UNITARY FUEL RESERVOIR

This is a Division of application Ser. No. 727,700, filed Apr. 26, 1985 now U.S. Pat. No. 4,638,836.

TECHNICAL FIELD

This invention relates generally to motor vehicle fuel tanks comprising a unitary fuel reservoir adapated to cooperate with an in-tank fuel sender assembly. More specifically, the invention relates to a motor vehicle fuel tank having a fluid pressure thermoformed tank wall forming a unitary fuel reservoir.

BACKGROUND OF THE INVENTION

Motor vehicle fuel tanks typically comprise a metal or synthetic material tank wall and a fuel sender assembly (also called a fuel pick-up assembly) mounted within the fuel tank and adapted to provide fuel to the vehicle engine. Generally the amount of fuel supplied to the engine is controlled by a carburetor which typically includes a carburetor bowl, that is a fuel reservoir within the carburetor. Such fuel reservoir is necessary since, if the fuel level in the fuel tank is low, the supply of fuel by the fuel sender assembly may be intermittently interrupted. This is especially so during vehicle acceleration, turning, etc. More recently, vehicle engines have employed electronic fuel injection systems which have no caraburetor bowl fuel reservoir. Accordingly, it is necessary to provide a reservoir in the fuel tank to insure continuous fuel supply by the in-tank fuel sender assembly during low fuel conditions. If fuel is not available to the fuel sender assembly, engine stalling will result. Numerous in-tank fuel reservoir designs are known to the art. Typically, however, these designs involve multi-component assemblies which involve costly assembly operations and undesirable added weight. U.S. Pat. No. 4,305,416 to Henning et al is typical of such multi-component assemblies. It suggest a fuel tank having a back-up tank assembly and related components mounted within the fuel tank.

Previously, unsuccessful attempts have been made to fluid pressure thermoform a fuel tank wall having a molded-in reservoir in the bottom surface of the tank, that is, to provide a convoluted bottom wall during thermoforming thereof to form a fuel reservoir. As used herein, fluid pressure thermoforming refers to any technique in which air (or other gas or liquid) pressure against the surface of a heated thermoplastic work piece is used to conform the work piece to the configuration of an underlying forming tool. Exemplary of well known fluid pressure thermoforming techniques is blow molding, in which a parison of molten thermoplastic material is formed and enclosed within a molding chamber. The ends of the parison are sealed and fluid pressure is injected into the parison to expand it outwardly against the surface of the molding chamber. Another exemplary fluid pressure thermoforming technique is vacuum forming, in which vacuum is applied from the surface of a molding tool causing atmospheric pressure to conform the work piece to the surface of the molding tool. Motor vehicle fuel tanks formed by such fluid pressure thermoforming techniques can provide significant cost and weight advantages and design flexibility advantages over fuel tanks formed of other materials and by other methods. It previously has not been possible, however, to fluid pressure thermoform a weight-competitive fuel tank with a suitably effective unitary fuel reservoir in a cost-effective manner without unacceptably thin tank wall areas (due to stretching of the wall material to form the reservoir) and other unacceptable structural deficiencies. It is an object of the present invention to provide a fluid pressure thermoformed fuel tank comprising a unitary fluid reservoir in the tank wall.

DISCLOSURE OF THE INVENTION

According to the present invention, a motor vehicle fuel tank has a fluid pressure thermoformed tank wall comprising a bottom wall and opposed side walls unitary with an extending upwardly from the bottom wall. The fuel tank comprises a fuel reservoir unitary with the tank wall and comprising two opposed substantially C-shaped ridges or walls extending upwardly into the tank from the plane of the bottom wall. Each of the ridges is of a certain height at a first end unitary with a corresponding one of the side walls, and each extends from such first end, toward the opposed side wall, to a second end. Each ridge, from a point remote from the second end thereof, preferably from a point at which the ridge begins the approach the other ridge, diminishes in height substantially continuously to the plane of the bottom wall of the tank. The two ridges cooperate to partially enclose a portion of the surface area of the bottom wall, thereby forming a fuel reservoir within the tank. The second end of each ridge is remote from the other ridge, that is, a channel exists between the second end of each ridge and the other ridge, which channel is substantially in the plane of the bottom wall of the fuel tank to permit fuel to flow into the aforesaid fuel reservoir from the remaining portion of the fuel tank, even during low fuel conditions.

According to another aspect of the invention, a preferred method of forming the above-described motor vehicle fuel tank with unitary fuel reservoir is provided. Specifically, such method comprises (A) forming a parison of molten thermoplastic material; (B) blow molding the parison, while molten, within a molding chamber, the molding surface of such molding chamber corresponding to the desired exterior contour of the fuel tank and providing reservoir-forming ridges corresponding to the C-shaped ridges of the fuel reservoir; and (c) removing the fuel tank from the molding chamber after cooling of the thermoplastic material.

In accordance with the present invention motor vehicle fuel tanks can be formed of thermoplastic materials using fluid pressure thermoforming techniques, which fuel tanks provide a unitary fuel reservoir with more uniform wall thickness, larger reservoir volume, lower lost tank volume (due to the reservoir walls intruding into the tank volume) and at a lower cost than previously was feasible. In fact, prior to the present invention a fluid pressure thermoformed fuel tank having a unitary fuel reservoir was not commercially feasible, for example, for passenger vehicles. By virtue of the present invention such fuel tanks now are possible which not only provide a fuel reservoir of suitable volume but, in addition, do so with reservoir walls which are themselves of acceptably small volume (the reservoir wall volume constituting lost fuel volume within the tank) wherein the tank wall material thickness is sufficiently maintained during formation of the reservoir walls that the cost and weight of the tank is competitive with alternative materials, designs, and manufacturing techniques. Other features and advantages of the invention

DETAILED DESCRIPTION OF PREFERRED EMBODIDMENTS

Figure 1:
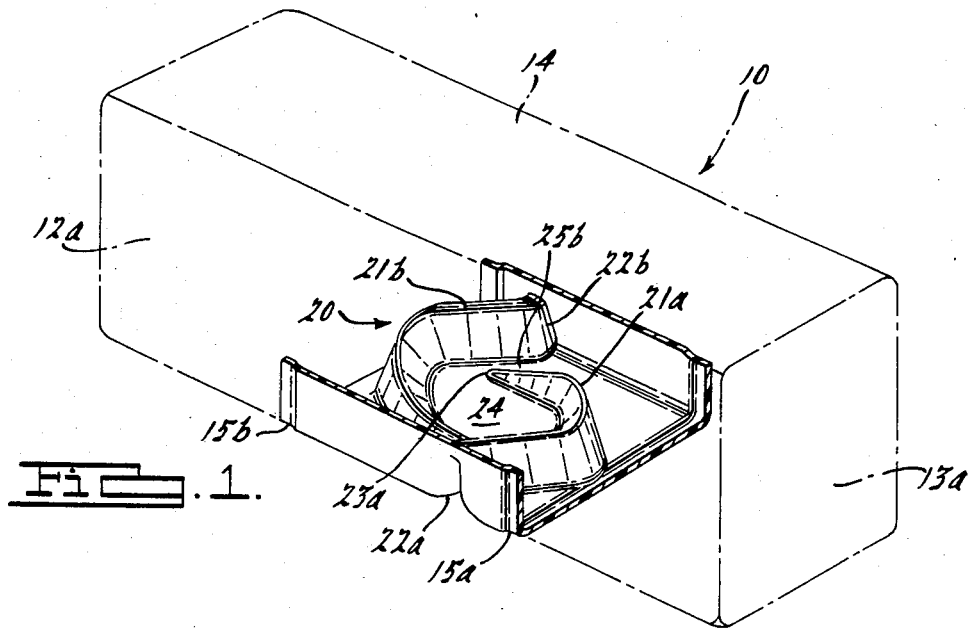
FIG. 1 is a perspective view of a motor vehicle fuel tank (deleting fuel sender assembly and like devices and attachments, and shown partially in phantom) showing a unitary fuel reservoir in the bottom wall of the tank, according to a preferred embodiment of the invention.
Figure 2:
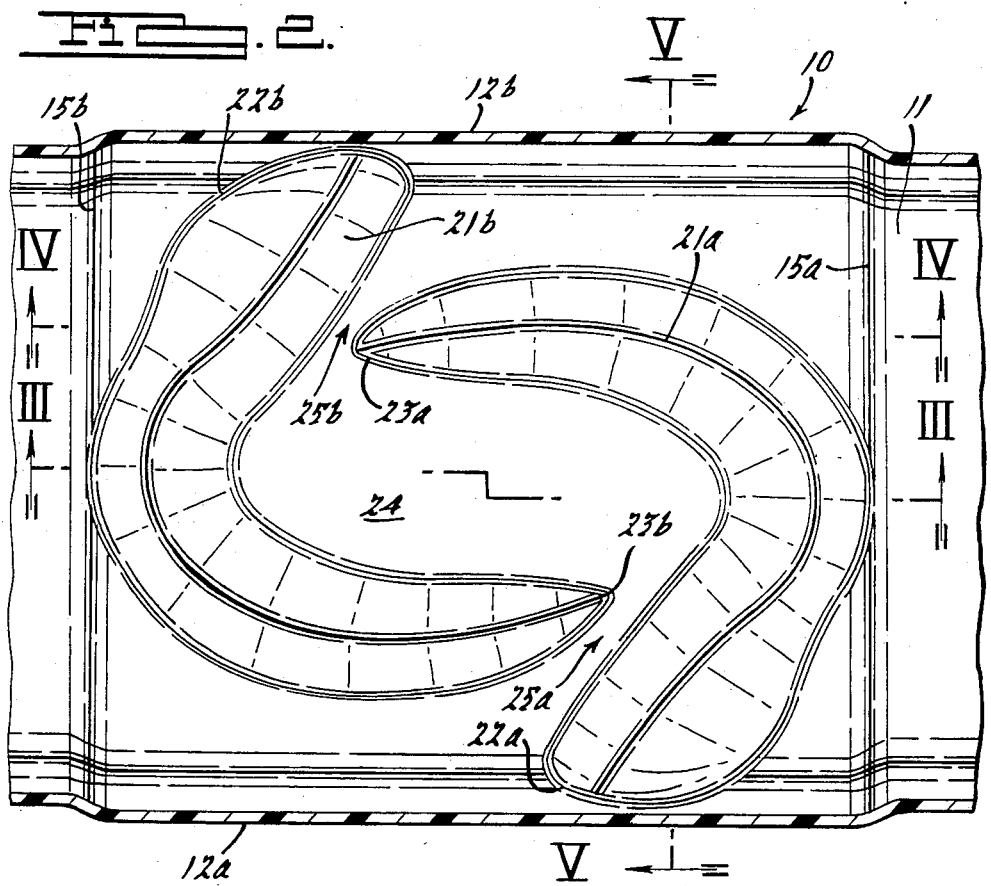
FIG. 2 is a plan view of the fuel reservoir and surrounding wall portions of the fuel tank of FIG. 1.
Figure 3:
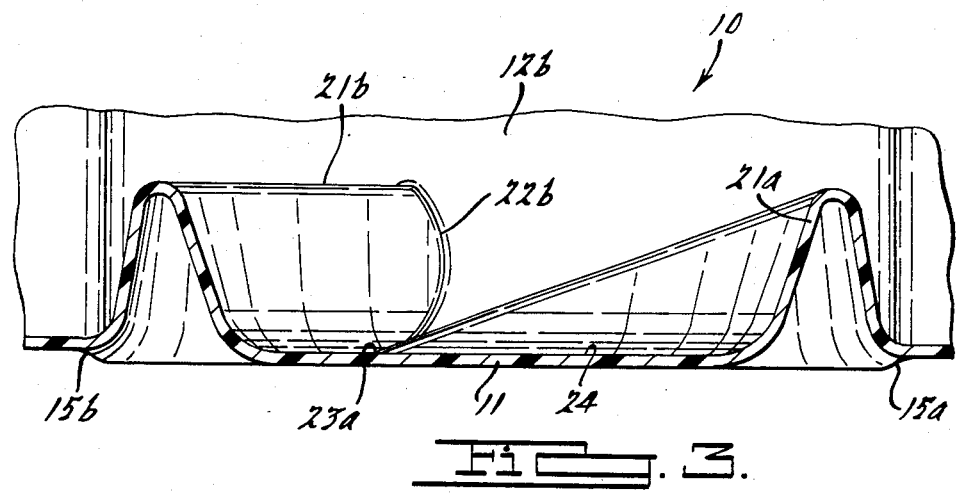
FIG. 3 is a side view of the fuel reservoir of FIG. 2, shown in cross-section taken through line 3—3, showing the convolutions which form the fuel reservoir walls in the bottom wall of the tank.
Figure 4:
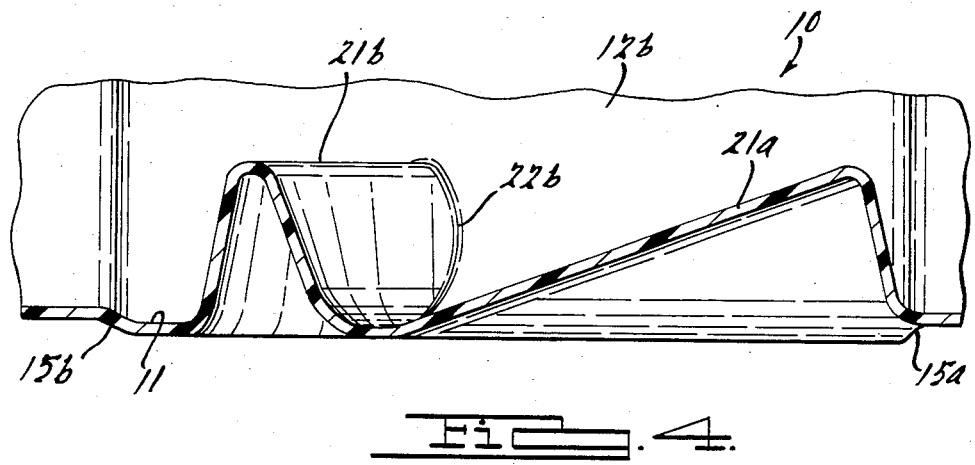
FIG. 4 is side view of the fuel reservoir of FIG. 2, shownin cross-section through line 4—4, showing the convolutions in the fuel tank bottom wall forming the fuel reservoir walls.
Figure 5:
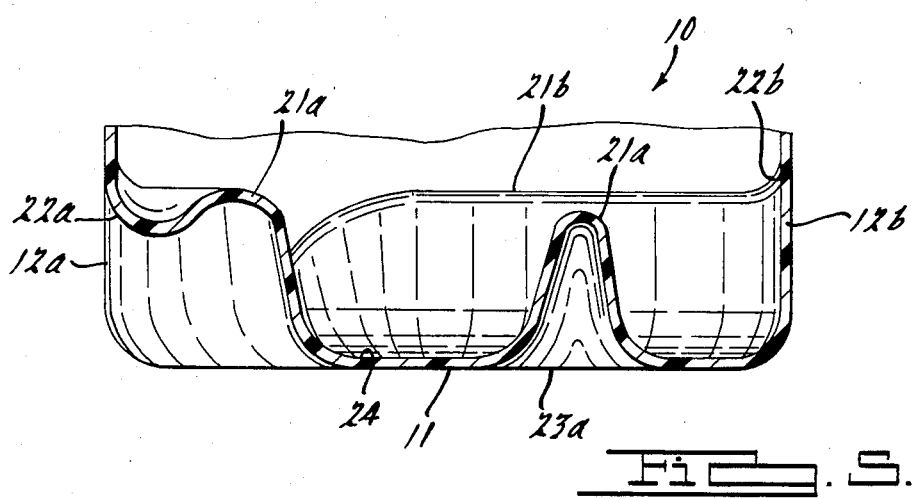
FIG. 5 is an end view of the fuel reservoir of FIG. 2, shown in cross-section through line 5—5, showing the convolutions of the bottom wall forming the fuel reservoir walls.

Referring now to FIGS. 1–5, a fuel tank 10 is seen to comprise a bottom wall 111, side walls 12a and 12b, end walls 13a and 13b, and top wall 14, all of which walls collectively are referred to herein as the fuel tank wall. It can be seen that in the preferred embodiment illustrated in the drawings, the bottom wall 11 comprises steps 15a and 15b, between which the interior surface of the bottom wall is lower than the remaining portion of the bottom wall interior surface. In those embodiments wherein the surface area of the bottom wall proximate the fuel reservoir is depressed in such manner, any reference to the plane of the bottom wall is a reference to the plane of such depressed portion of the bottom wall surface area. Optionally, the surface area of the bottom wall within the fuel reservoir can be lower than the surface area of the bottom outside the fuel reservoir.

In the fuel tank illustrated in the drawings the tank walls are unitary with each other and the fuel reservoir 20 is unitary with the walls. The fuel reservoir is seen to comprise two opposed substantially C-shaped ridges 21a and 21b. The two fuel reservoir ridges are substantially identical in configuration. Each extend upwardly into the fuel tank from the plane of the bottom wall and extends laterally substantially parallel to the plane of the bottom wall from one side wall toward the other. More specifically, each ridge starts with a certain height at a first end 22a and 22b, which first end is unitary with a corresponding one of the side walls 12a and 12b, respectively. The height of the ridge can remain substantially constant over a first portion thereof and then diminishes preferably in a substantially continuous manner toward the second end of the ridge 23a and 23b at which point it fairs into the surface of the bottom wall of the fuel tank. The two ridges, that is the two fuel reservoir walls, cooperate to partially enclose a portion 24 of the bottom wall of the fuel tank. A channel is provided between the end of each fuel reservoir wall and the other fuel reservoir wall. Such channels 25a and 25b are coplanar with the surface of the bottom wall so as to permit fuel to flow into the fuel reservoir from the remainder of the fuel tank even when there is a low level in the tank.

It will be understood from the foregoing that fuel will be trapped within the fuel reservoir by the fuel reservoir walls. Thus, during vehicle acceleration, travel up or down an inclined slope and similar vehicle dynamics, fuel will be held within the reservoir available to the fuel sender assembly. The fuel sender assembly (not shown) can be according to any of the numerous designs well known to the skilled of the art. Typically, such fuel sender assembly would comprise a pump mounted either inside the tank or remote therefrom, and would further comprise a fuel pick-up port mounted to float on the surface of the fuel in the tank. As the fuel level drops the fuel pick-up port would descend therewith into the fuel reservoir area. Thus, the fuel reservoir acts to protect against interruptions in the supply of fuel from the fuel tank to the vehicle engine.

It is a particularly significant feature of the present invention that the fuel reservoir walls diminish in height from a point remote from the second end 23a, 23b, preferably from the point at which the wall begins to approach the other wall. Each wall fairs into the plane of the bottom wall at its second end. It has been discovered that this enables a significant increase in the volume of the reservoir and a significanata increase in the ability of the reservoir to hold fuel under low fuel conditions. In fact, if the height of the reservoir wall is not diminished as it approaches the other wall and, rather, is continued at some height all the way to its second end, a suitable fuel tank is found to be infeasible in that webbing occurs across the channels 25a and 25b. That is, the severe stress placed upon the fuel tank wall by such design would cause an unwanted web or wrinkle of material to arise across the aforesaid channel. This, of course, would act as a dam preventing flow of fuel into the fuel reservoir area. This material stretch-generated web would not be avoided by using a lower viscosity material nor even by greater fluid pressure (within reasonably achievable levels) during the fluid pressure thermoforming process. While the web could be avoided by terminating the reservoir wall at a greater distance from the other reservoir wall, that is by widening the channel between the two walls, this would be highly undesirable in that it would significantly decrease the volume of the fuel reservoir and reduce the ability of the reservoir to entrap fuel during vehicle dynamics under low fuel conditions. The same would result if one attempted tó avoid the aforesaid stretch-generated web across the channels between the fuel reservoir walls by decreasing the height of each fuel reservoir wall in the area proximate the second end of the other fuel reservoir wall.

According to preferred embodiments of the invention, and as shown in the drawings, the first end 22a, 22b of the fuel reservoir walls forms an approximately 90° angle with the side wall 12a, 12b, respectively, of the fuel tank. If a fuel reservoir wall met the side wall at any other angle, then on one side thereof it would intersect at an acute angle. It will be understood by those skilled in the art that an acute angle of intersection would generate greater material stress in the course of thermoforming. This could be avoided only by providing a greater radius of curvature at the intersection or by lowering the height of the reservoir wall where it intersects the side wall. Providing a greater radius of curvature would necessarily increase the total volume of the reservoir wall which would, of course, mean that the total fuel volume of the fuel tank would be correspondingly decreased. As to lower height of the fuel reservoir wall at the intersection with the side wall, the significant disadvantages of lowering the reservoir wall height have already been discussed.

A significant advantage of the present fuel tank invention is the avoidance of thin sections in the tank wall. That is, it is found that a fluid pressure thermoformed fuel tank according to the invention is able to meet minimum wall thickness requirements employing starting material of less thickness than would be required by other configurations. While meeting minimum thickness requirements in the tank wall could be achieved also by employing a thicker starting material, this would involve a significant weight penalty which would result in a decrease in the fuel efficiency of the motor vehicle.

As mentioned above, fluid pressure thermoforming includes production techniques such as blow molding and vaccuum forming. According to a method aspect of the invention, a fuel tank, as described above, is vacuum formed or, more preferably, blow molded according to techniques known to the skilled in the art. Blow molding such fuel tank comprises forming a parison, that is a tube of molten thermoplastic material, and enclosing the parison within the chamber of the molding tool. The ends of the parison are pinched together to form a substantially fluid pressure-tight tube and fluid pressure is injected into such tube. The fluid pressure expands the parison against the surface of the molding tool which corresponds to the desired exterior contour of the fuel tank. Such molding tool also provides reservoir wall-forming ridges corresponding to the C-shaped ridges of the fuel reservoir. The blow molded fuel tank then is removed from the flow molding chamber, typically after some degree of cooling. It will be appreciated that in blow molded fuel tanks according to the invention the tank wall can be entirely unitary, including the convolutions in the bottom wall forming the fuel reservoir.

Numerous suitable thermoplastic materials will be apparent to the skilled of the art in view of the present disclosure. In general, if the fuel tank is to be employed in a passenger vehicle it should provide good "toughness" which is a function of both the elongation and tensile strength of the material. This includes low temperature toughness and, in particular, the material should have a glass transition temperature lower than the lowest temperature to which the fuel tank would be exposed in service. The material also should be sufficiently inert to the fuel which is to be carried in the fuel tank and to corrosive agents to which the fuel tank would be exposed in service. Presently preferred for use is a high density thermoplastic polyethylene of density between about 0.945 and about 0.952 grams per $cm^3$ (measured according to astm d-792), melt index not greater than about 12 grams per ten minutes (measured according to ASTM D-1238, Condition F using 21.6 Kgm weight), tensile strength at least about 2600 psi (measured according to ASTM D-638, Type 4, Spec Die "C" 50 cc per minute), and elongation at least about 200 percent (measured according to ASTM D-638, Type 4, Spec Die "C" 50 cc per minute), and having carbon black content between about 0.75 percent and 1.25 percent by weight. Other suitable materials will be readily apparent to the skilled of the art in view of the present disclosure. It should be recognized that the suitability of materials will depend largely on the intended use of the fuel tank. Suitable means for reducing emissions of volatile hydrocarbon fuels or the like by permeation through the fuel tank wall are known to the skilled of the art. Included, for example, are fluorine gas treatments for the interior surface of the fuel tank and, at least in the case of polyethylene materials, the admixture of certain barrier resins.

If manufactured by a vacuum forming technique, the fuel tank typically would be formed in two halves, that is two shells, a lower half comprising the bottom wall with the fuel reservoir and a portion of the side and end walls, and the second half comprising the top wall and a portion of the side and end walls. The two halves would be sealed together according to methods well known to the skilled of the art to form the fuel tank.

I claim:

1. A method of forming a motor vehicle fuel tank having a unitary tank wall comprising a bottom wall and opposed side walls extending upwardly from said bottom wall, said fuel tank comprising a fuel reservoir unitary with said tank wall and comprising two opposed subtantially C-shaped ridges extending upwardly into said tank from the plane of said bottom wall, each said ridge being of certain height at a first end unitary with a corresponding one of said side walls and each said ridge fairing into said corresponding one of said side walls and extending toward the opposed side wall to a second end, said ridge from a point remote from said second end diminishing in height substantially continuously to approximately the plane of said bottom wall, said ridges cooperating to partially surround a portion of the surface area of said bottom wall, a channel between the second end of each said ridge and the other said ridge extending substantially in the plane of said bottom wall to permit fuel to flow to said partially surrounded surface area from the remaining portion of the surface area of said bottom wall, said method comprising:

(A) forming a parison of molten thermoplastic material;

(B) blow molding said parison while molten within a molding chamber, the molding surface of said molding chamber corresponding to the exterior contour of said fuel tank and providing reservoir wall-forming ridges corresponding to said C-shaped ridges of said fuel reservoir; and (C) removing said fuel tank from said molding chamber after cooling of said thermoplastic material.

2. The method of claim 1, wherein said thermoplastic material comprises high density thermoplastic polyethylene of density between about 0.945 and about 0.952, melt index not greater than about 12 grams per ten minutes, tensile strength at least about 2600 psi, elongation at least about 200%, and having carbon black content between about 0.75% and 1.25% by weight.

* * * * *